(12) United States Patent
Pan et al.

(10) Patent No.: US 12,480,796 B2
(45) Date of Patent: Nov. 25, 2025

(54) METERING METHOD BASED ON CONVERTED SLIP RATIO FITTING FOR WET NATURAL GAS

(71) Applicants: Haimo Subsea Technology (Shanghai) co., Ltd., Shanghai (CN); Haimo Subsea Technologies (Shenzhen) Co., Ltd., Shenzhen (CN)

(72) Inventors: Yanzhi Pan, Shanghai (CN); Pengrong Wen, Shanghai (CN); Jianhua Xie, Shenzhen (CN); Xiaodong Zhang, Shenzhen (CN)

(73) Assignees: Haimo Subsea Technology (Shanghai) co., Ltd., Shanghai (CN); Haimo Subsea Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/694,426

(22) PCT Filed: Apr. 20, 2023

(86) PCT No.: PCT/CN2023/089553
§ 371 (c)(1),
(2) Date: Mar. 22, 2024

(87) PCT Pub. No.: WO2024/098673
PCT Pub. Date: May 16, 2024

(65) Prior Publication Data
US 2025/0130086 A1 Apr. 24, 2025

(30) Foreign Application Priority Data
Dec. 21, 2022 (CN) .......................... 202211651518.2

(51) Int. Cl.
*G01F 1/88* (2006.01)
*F17D 3/18* (2006.01)
*G01F 1/74* (2006.01)

(52) U.S. Cl.
CPC ................. *G01F 1/88* (2013.01); *F17D 3/18* (2013.01); *G01F 1/74* (2013.01)

(58) Field of Classification Search
None
See application file for complete search history.

(56) References Cited

U.S. PATENT DOCUMENTS

| 5,461,930 A | 10/1995 | Farchi et al. | |
| 2008/0295607 A1* | 12/2008 | Di Maggio | ........ G01N 33/2823 |
| | | | 73/861.04 |

(Continued)

FOREIGN PATENT DOCUMENTS

| CN | 105675070 A | 6/2016 |
| CN | 112964316 A | 6/2021 |

(Continued)

*Primary Examiner* — Matthew G Marini
(74) *Attorney, Agent, or Firm* — Bayramoglu Law Offices LLC (57) ABSTRACT

A metering method based on converted slip ratio fitting for wet natural gas is provided. The method includes fitting relationships between a gas Froude number and Venturi differential pressure and Venturi pressure loss with known data to obtain a gas Froude number calculation formula; dividing the known data according to a size of the gas Froude number, and performing piecewise fitting to obtain a piecewise converted slip ratio calculation formula under different gas Froude numbers; performing fitting on the dryness fraction and the converted slip ratio calculation formula; and acquiring, on the basis of the gas Froude number calculation formula, the converted slip ratio calculation formula, an overrated factor calculation formula and a dryness fraction calculation formula, some necessary real- (Continued)

time data to calculate a real-time flow rate of the wet gas. The method avoids using a ray flow meter and has advantages that include accurate metering and no radioactive pollution.

5 Claims, 3 Drawing Sheets

(56) References Cited

U.S. PATENT DOCUMENTS

2011/0040485 A1 2/2011 Ong
2019/0339102 A1 11/2019 Chen et al.

FOREIGN PATENT DOCUMENTS

| CN | 113389540 A | 9/2021 |
| CN | 115060626 A | 9/2022 |
| CN | 115420342 A | 12/2022 |
| CN | 115855187 A | 3/2023 |
| JP | 2014232007 A | 12/2014 |

* cited by examiner

METERING METHOD BASED ON CONVERTED SLIP RATIO FITTING FOR WET NATURAL GAS

CROSS REFERENCE TO THE RELATED APPLICATIONS

This application is the national phase entry of International Application No. PCT/CN2023/089553, filed on Apr. 20, 2023, which is based upon and claims priority to Chinese Patent Application No. 202211651518.2, filed on Dec. 21, 2022, the entire contents of which are incorporated herein by reference.

TECHNICAL FIELD

The present disclosure relates to natural gas extraction engineering, and in particular to a flow metering method in a natural gas extraction process.

BACKGROUND

The state advocates carbon neutralization, strives to reach the peak value by 2030, and strives to realize carbon neutralization by 2060. Compared with petroleum, natural gas has the advantages of low carbon and high efficiency, is a cleaner energy source, and also an important transitional resource for realizing carbon neutralization in the future. The whole world has stepped up its efforts to extract natural gas.

A wet gas flow meter is an important apparatus for natural gas exploitation, which provides important real-time metering data for gas reservoir management and enhanced oil recovery. There are two main technologies for the wet gas flow meter, one is "Venturi+gamma ray" technology, and the other is "V-cone+gamma ray" technology. Both technologies require two metering methods to cooperate with each other, and integrate their respective data to calculate a flow rate of wet gas (gas and liquid two-phase flow).

However, although such two technologies are widely used, existing wet gas flow meters are limited in application in some areas due to safety regulatory issues for gamma radiation sources, and therefore, it is necessary to develop a wet gas flow metering technology of the non-ray technology.

Figure 1:
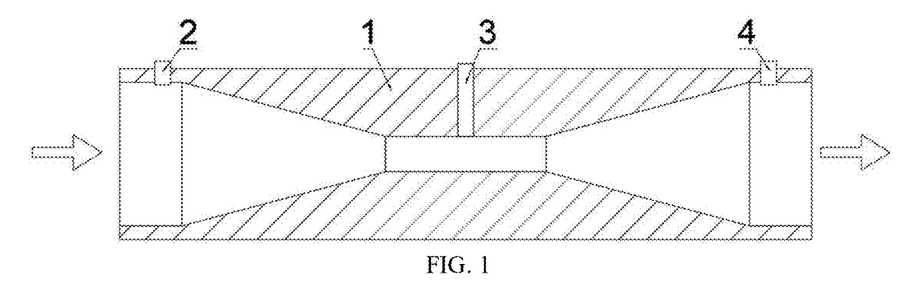
FIG. 1 is a schematic diagram of an internal structure of a Venturi tube.
Figure 2:
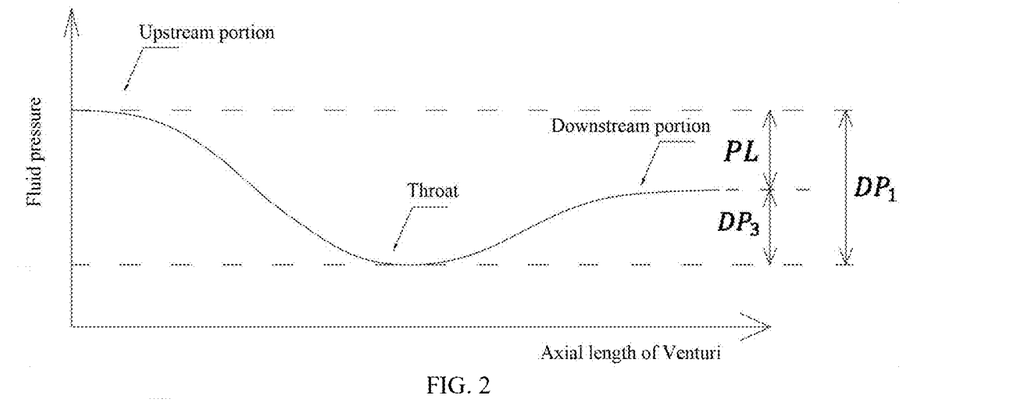
FIG. 2 is a schematic diagram of pressure changes during flowing of wet gas in a Venturi tube.

As the mature prior art, the basic principle of the Venturi metering technology is shown in FIG. 1. Venturi differential pressure $DP_1$ is measured by taking pressure (2 and 3) at the upstream portion and the throat of a Venturi tube respectively, Venturi pressure loss PL is measured by taking pressure at the upstream portion and downstream portion (2 and 4) of the Venturi tube respectively. When wet gas flows in the Venturi tube, the pressure decreases first and then recovers, as shown in FIG. 2.

SUMMARY OF THE INVENTION

In view of the above reasons, the present disclosure provides a metering method based on converted slip ratio fitting for wet natural gas, which performs virtual metering only based on a basic Venturi flow meter and gets rid of dependence on a ray flow meter. In practical application, the metering method has the advantages of accurate metering, small errors and no radioactive pollution, and has practical application value and significance.

The main technical solutions employed by the present disclosure are implemented according to the following steps:

Firstly, fitting relationships between a gas Froude number and Venturi differential pressure and Venturi pressure loss with known data to obtain a gas Froude number calculation formula, which specifically includes the following steps:

step 1, acquiring a fitting array, where
the fitting array includes some one-to-one corresponding data including a gas Froude number Frg, Venturi pressure loss PL, Venturi differential pressure $DP_1$, a converted slip ratio SS, a dryness fraction X and an overrated factor OR; and step 2, fitting relationships between the gas Froude number Frg and the Venturi pressure loss PL and Venturi differential pressure $DP_1$ according to Formula (1) as follows:

$$Frg = F(DP_3), \quad \text{Formula (1)}$$

where $$DP_3 = DP_1 - PL,$$

and a gas Froude number calculation formula is obtained by means of fitting.

Then, dividing the known data according to a size of the gas Froude number, and fitting relationships between a converted slip ratio and the Venturi differential pressure and the Venturi pressure loss in sections according to the section of the known data to obtain a piecewise converted slip ratio calculation formula under different gas Froude numbers, which specifically includes the following steps:

step 3, setting a division range according to a data size of the gas Froude number Frg, and dividing the fitting array into three sections, namely a high Frg section, a medium Frg section and a low Frg section; and fitting, according to the section to which the fitting array belongs, relationships between the converted slip ratio SS and the Venturi pressure loss PL and the Venturi differential pressure $DP_1$ in sections, as shown in Formula group (2) as follows:

$$\begin{cases} SS = f_1(k), & Frg > x_2; \\ SS = f_2(k), & x_1 \leq Frg \leq x_2; \\ SS = f_3(k), & Frg < x_1; \end{cases} \quad \text{Formula group (2)}$$

In the formula group,
$x_1$, $x_2$ are both natural numbers, $x_1 < x_2$, and $$k = DP_1/DP_3.$$

A piecewise converted slip ratio calculation formula is obtained by means of fitting.

Then, fitting relationships between the overrated factor OR and the dryness fraction X, and the converted slip ratio SS respectively to obtain a dryness fraction calculation formula and a converted slip ratio calculation formula:

step 4, fitting a relationship between the overrated factor OR and the converted slip ratio SS according to Formula (3) as follows:

$$OR = f_4(SS), \quad \text{Formula (3)}$$

thereby obtaining an overrated factor calculation formula; and fitting a relationship between the dryness fraction X and the converted slip ratio SS according to Formula (4) as follows:

$$X = f_5(SS), \qquad \text{Formula (4)}$$

thereby obtaining a dryness fraction calculation formula.

Next, acquiring, on the basis of the gas Froude number calculation formula, the converted slip ratio calculation formula, the overrated factor calculation formula and the dryness fraction calculation formula, some necessary real-time data to calculate a real-time flow rate of wet gas, which specifically includes the following step:

step 5, acquiring a calculation array of wet gas to be measured, where the calculation array includes some one-to-one corresponding data including real-time Venturi pressure loss $PL^s$, real-time Venturi differential pressure $DP_1^s$, and a real-time gas phase density $\rho_g$.

A real-time $k^s$ value is calculated according to Formula (5) as follows:

$$k^s = \frac{DP_1^s}{DP_1^s - PL^s}. \qquad \text{Formula (5)}$$

A real-time $DP_3^s$ value is calculated according to Formula (6) as follows:

$$DP_3^s = DP_1^s - PL^s. \qquad \text{Formula (6)}$$

After the above data is obtained, the real-time gas Froude number is obtained by using the real-time $DP_3^s$ data first, the section range of the real-time data is determined according to the size of the real-time gas Froude number on the basis of the same rule, and related data are plugged into the piecewise converted slip ratio calculation formula, so as to calculate a real-time converted slip ratio. Then, a real-time overrated factor and a real-time dryness fraction are calculated on the basis of the converted slip ratio, which specifically includes the following steps:

step 6, calculating a real-time overrated factor $OR^s$ and a real-time dryness fraction $X^s$;

plugging the real-time $DP_3^s$ value into the gas Froude number calculation formula obtained in step 2 to obtain a real-time gas Froude number $Frg^s$, comparing the three values of $Frg^s, x_1$ and $x_2$, and determining the section to which the calculation array belongs by taking the division range set in step 3 as a standard;

plugging the real-time $k^s$ value into the corresponding section in the piecewise converted slip ratio calculation formula obtained in step 3 to calculate and obtain the real-time converted slip ratio $SS^s$;

plugging the real-time converted slip ratio $SS^s$ into the overrated factor calculation formula obtained in step 4 to calculate and obtain a real-time overrated factor $OR^s$; and plugging the real-time converted slip ratio $SS^s$ into the dryness fraction calculation formula obtained in step 4 to calculate and obtain the real-time $X^s$.

Finally, overrating a gas mass flow rate in combination with a real-time calibrated gas phase density and liquid phase density to obtain a real-time gas phase mass flow rate and a real-time liquid phase mass flow rate by means of calculation:

Step 7, calculating an overrated gas mass flow rate $M_{tp}$ according to Formula (7) as follows:

$$M_{tp} = CEd^2 \sqrt{DP_1^s * \rho_g}. \qquad \text{Formula (7)}$$

In the formula, C and E are both constants, and d represents a diameter of the throat of a Venturi.

Step 8, calculating a real-time gas phase mass flow rate $M_g$ of wet gas to be measured according to Formula (8) as follows:

$$M_g = M_{tp}/OR^s. \qquad \text{Formula (8)}$$

Step 9, calculating a real-time liquid phase mass flow rate $M_l$ of the wet gas to be measured according to Formula (9) as follows:

$$M_l = \frac{M_g(1 - X^s)}{X^s}. \qquad \text{Formula (9)}$$

DETAILED DESCRIPTION OF THE EMBODIMENTS

The present disclosure will be further described below with reference to the examples and the accompanying drawings.

Example 1

A metering method based on converted slip ratio fitting for wet natural gas is implemented according to the following steps:

step 1, acquire a fitting array, where the fitting array includes some one-to-one corresponding data including a gas Froude number Frg, Venturi pressure loss PL, Venturi differential pressure $DP_1$, a converted slip ratio SS, a dryness fraction X and an overrated factor OR.

Step 2, fit relationships between the gas Froude number Frg and the Venturi pressure loss PL and Venturi differential pressure $DP_1$ according to Formula (1) as follows:

$$Frg = F(DP_3). \qquad \text{Formula (1)}$$

In the formula, $DP_3 = DP_1 - PL$, and a gas Froude number calculation formula is obtained by means of fitting.

Step 3, set a division range according to a data size of the gas Froude number Frg, and divide the fitting array into three sections, namely a high Frg section, a medium Frg section and a low Frg section; and fit, according to the section to which the fitting array belongs, relationships between the converted slip ratio SS and the Venturi pressure loss PL and the Venturi differential pressure $DP_1$ in sections, as shown in Formula group (2) as follows:

$$\begin{cases} SS = f_1(k), & Frg > x_2; \\ SS = f_2(k), & x_1 \le Frg \le x_2; \\ SS = f_3(k), & Frg < x_2; \end{cases} \qquad \text{Formula group (2)}$$

In the formula group, $x_1$, $x_2$ are both natural numbers, $x_1 < x_2$, and $$k = DP_1/DP_3.$$

A piecewise converted slip ratio calculation formula is obtained by means of fitting.

Step 4, fit a relationship between the overrated factor OR and the converted slip ratio SS according to Formula (3) as follows:

$$OR = f_4(SS), \qquad \text{Formula (3)}$$

thereby obtaining an overrated factor calculation formula.

Fit a relationship between the dryness fraction X and the converted slip ratio SS according to Formula (4) as follows:

$$X = f_5(SS), \qquad \text{Formula (4)}$$

thereby obtaining a dryness fraction calculation formula.

Step 5, acquire a calculation array of wet gas to be measured, where the calculation array includes some one-to-one corresponding data including real-time Venturi pressure loss $PL^s$, real-time Venturi differential pressure $DP_1^s$, and a real-time gas phase density $\rho_g$.

A real-time $k^s$ value is calculated according to Formula (5) as follows:

$$k^s = \frac{DP_1^s}{DP_1^s - PL^s}. \qquad \text{Formula (5)}$$

A real-time $DP_3^s$ value is calculated according to Formula (6) as follows:

$$DP_3^s = DP_1^s - PL^s. \qquad \text{Formula (6)}$$

Step 6, calculate a real-time overrated factor $OR^s$ and a real-time dryness fraction $X^s$;

plug the real-time $DP_3^s$ value into the gas Froude number calculation formula obtained in step 2 to obtain a real-time gas Froude number $Frg^s$, compare the three values of $Frg^s, x_1$ and $x_2$, and determine the section to which the calculation array belongs by taking the division range set in step 3 as a standard;

plug the real-time $k^s$ value into the corresponding section in the piecewise converted slip ratio calculation formula obtained in step 3 to calculate and obtain the real-time converted slip ratio $SS^s$;

plug the real-time converted slip ratio $SS^s$ into the overrated factor calculation formula obtained in step 4 to calculate and obtain a real-time overrated factor $OR^s$; and plug the real-time converted slip ratio $SS^s$ into the dryness fraction calculation formula obtained in step 4 to calculate and obtain the real-time $X^s$.

Step 7, calculate an overrated gas mass flow rate $M_{tp}$ according to Formula (7) as follows:

$$M_{tp} = CEd^2 \sqrt{DP_1^s * \rho_g}. \qquad \text{Formula (7)}$$

In the formula, C and E are both constants, and d represents a diameter of the throat of a Venturi.

Step 8, calculate a real-time gas phase mass flow rate $M_g$ of wet gas to be measured according to Formula (8) as follows:

$$M_g = M_{tp}/OR^s. \qquad \text{Formula (8)}$$

Step 9, calculate a real-time liquid phase mass flow rate $M_l$ of the wet gas to be measured according to Formula (9) as follows:

$$M_l = \frac{M_g(1 - X^s)}{X^s}. \qquad \text{Formula (9)}$$

Example 2

This example differs from Example 1 only in that in step 2, fitting is performed according to Formula (1) as follows:

$$Frg = F(DP_3) = a_1 * DP_3^3 + b_1 * DP_3^2 + c_1 * DP_3 + d_1. \qquad \text{Formula (1)}$$

In the formula, $a_1$, $b_1$, $c_1$, $d_1$ are all natural numbers, and the calculation can be obtained by means fitting after some Frg and $DP_3$ are plugged.

Example 3

This example differs from Example 1 only in that in step 3, piecewise fitting is performed according to Formula group (2) as follows:

$$\begin{cases} SS = f_1(k) = a_2k^{b_2} + c_2, & Frg > x_2; \\ SS = f_2(k) = a_3k^{b_3} + c_3, & x_1 \le Frg \le x_2; \\ SS = f_3(k) = a_4k^{b_4k} + a_5e^{b_4k}, & Frg < x_1; \end{cases}$$ Formula group (2)

In the formula group, $a_2$, $a_3$, $a_4$, $a_5$, $b_2$, $b_3$, $b_4$, $b_5$, $c_2$, $c_3$ are all natural numbers, and specific parameters can be obtained by fitting some data including the converted slip ratio SS, the Venturi pressure loss PL and the Venturi differential pressure $DP_1$.

Example 4

This example differs from Example 1 only in that in step 4, fitting is performed to obtain an overrated factor calculation formula according to Formula (3) as follows:

$$OR = f_4(SS) = a_6 SS^{b_6} + c_6.$$ Formula (3)

In the formula, $a_6$, $b_6$ and $c_6$ are all natural numbers which are obtained by fitting the overrated factor OR and the converted slip ratio SS.

Fitting is performed to obtain the dryness fraction calculation formula according to Formula (4) as follows:

$$X = f_5(SS) = a_7 SS^{b_7} + c_7.$$ Formula (4)

In the formula, $a_7$, $b_7$ and $c_7$ are all natural numbers which are obtained by fitting the dryness fraction X and the converted slip ratio SS.

Example 5

A metering method based on converted slip ratio fitting for wet natural gas is implemented according to the following steps:

step 1, acquire a fitting array, where
the fitting array includes some one-to-one corresponding data including a gas Froude number Frg, Venturi pressure loss PL, Venturi differential pressure $DP_1$, a converted slip ratio SS, a dryness fraction X and an overrated factor OR.

Step 2, fit relationships between the gas Froude number Frg and the Venturi pressure loss PL and Venturi differential pressure $DP_1$ according to Formula (1) as follows:

$$Frg = F(DP_3) = a_1 * DP_3^3 + b_1 * DP_3^2 + c_1 * DP_3 + d_1.$$ Formula (1)

In the formula, $DP_3 = DP_1 - PL$,
$a_1$, $b_1$, $c_1$, $d_1$ are all natural numbers, and specific parameters can be obtained by means fitting after some Frg and $DP_3$ are plugged,
thereby obtaining a gas Froude number calculation formula by means of fitting.

Step 3, set a division range according to a data size of the gas Froude number Frg, and divide the fitting array into three sections, namely a high Frg section, a medium Frg section and a low Frg section; and fit, according to the section to which the fitting array belongs, relationships between the converted slip ratio SS and the Venturi pressure loss PL and the Venturi differential pressure $DP_1$ in sections, as shown in Formula group (2) as follows:

$$\begin{cases} SS = f_1(k) = a_2k^{b_2} + c_2, & Frg > x_2; \\ SS = f_2(k) = a_3k^{b_3} + c_3, & x_1 \le Frg \le x_2; \\ SS = f_3(k) = a_4e^{b_4k} + a_5e^{b_5k}, & Frg < x_1; \end{cases}$$ Formula group (2)

In the formula group,
$x_1$, $x_2$ are both natural numbers, $x_1 < x_2$, and $$k = DP_1/DP_3.$$

$a_2$, $a_3$, $a_4$, $a_5$, $b_2$, $b_3$, $b_4$, $b_5$, $c_2$, $c_3$ are all natural numbers, and specific parameters can be obtained by fitting some data including the converted slip ratio SS, the Venturi pressure loss PL and the Venturi differential pressure $DP_1$, thereby obtaining a piecewise converted slip ratio calculation formula by means of fitting.

Supplementary description is made to step 3 with one example. For example, there are three fitting arrays as follows:

the first fitting array includes: a gas Froude number $Frg_1$, Venturi pressure loss $PL_1$, Venturi differential pressure $DP_{1,1}$ and a converted slip ratio $SS_1$.

The second fitting array includes: a gas Froude number $Frg_2$, Venturi pressure loss $PL_2$, Venturi differential pressure $DP_{1,2}$ and a converted slip ratio $SS_2$.

The third fitting array includes: gas Froude number $Frg_3$, Venturi pressure loss $PL_3$, Venturi differential pressure $DP_{1,3}$ and a converted slip ratio $SS_3$.

After the division range of Frg is set:
For the first fitting array, $Frg > x_2$, which belongs to a high Frg section range.

For the second fitting array, $Frg \ge x_1$, and $Frg \le x_2$, which belongs to a medium Frg section range.

For the third fitting array, $Frg < x_1$, which belongs to a low Frg section range.

Therefore, during fitting:
the first fitting array should be fitted according to $SS = f_1(k) = a_2k^{b_2} + c_2$,
the second fitting array should be fitted according to $SS = f_2(k) = a_3k^{b_3} + c_3$, and
the third fitting array should be fitted according to $SS = f_3(k) = a_4e^{b_4k} + a_5e^{b_5k}$.

Certainly, during respective fitting of the three sections, enough data is required to so as to obtain the corresponding parameters.

Step 4, fit a relationship between the overrated factor OR and the converted slip ratio SS according to Formula (3) as follows:

$$OR = f_4(SS) = a_6 SS^{b_6} + c_6.$$ Formula (3)

In the formula, $a_6$, $b_6$ and $c_6$ are all natural numbers, and specific parameters are obtained by fitting the overrated factor OR and the converted slip ratio SS, thereby obtaining an overrated factor calculation formula by means of fitting.

Fit a relationship between the dryness fraction X and the converted slip ratio SS according to Formula (4) as follows:

$$X = f_5(SS) = a_7 SS^{b_7} + c_7.\qquad\text{Formula (4)}$$

In the formula, $a_7$, $b_7$ and $c_7$ are all natural numbers, and specific parameters are obtained by fitting the dryness fraction X and the converted slip ratio SS, thereby obtaining a dryness fraction calculation formula by means of fitting.

Step 5, acquire a calculation array of wet gas to be measured, where the calculation array includes some one-to-one corresponding data including real-time Venturi pressure loss $PL^s$, real-time Venturi differential pressure $DP_1^s$, and a real-time gas phase density $\rho_g$.

A real-time $k^s$ value is calculated according to Formula (5) as follows:

$$k^s = \frac{DP_1^s}{DP_1^s - PL^s}.\qquad\text{Formula (5)}$$

A real-time $DP_3^s$ value is calculated according to Formula (6) as follows:

$$DP_3^s = DP_1^s - PL^s.\qquad\text{Formula (6)}$$

Step 6, calculate a real-time overrated factor $OR^s$ and a real-time dryness fraction $X^s$.

Plug the real-time $DP_3^s$ value into the gas Froude number calculation formula obtained in step 2 to obtain a real-time gas Froude number $Frg^s$, compare the three values of $Frg^s$, $x_1$ and $x_2$, and determine the section to which the calculation array belongs by taking the division range set in step 3 as a standard.

Plug the real-time $k^s$ value into the corresponding section in the piecewise converted slip ratio calculation formula obtained in step 3 to calculate and obtain the real-time converted slip ratio $SS^s$, where the specific situation are as follows:

when $Frg^s > x_2$, the calculation array belongs to the high Frg section range, and related data ($k^s$) should be plugged into $SS = f_1(k) = a_2 k^{b_2} + c_2$ to calculate the converted slip ratio (in this case, all parameters in the formula are known).

When $Frg^s \geq x_1$ and $Frg^s \leq x_2$, the calculation array belongs to the medium Frg section range, and the related data ($k^s$) should be plugged into $SS = f_2(k) = a_3 k^{b_3} + c_3$ to calculate the converted slip ratio (in this case, all parameters in the formula are known).

When $Frg^s < x_1$, the calculation array belongs to the low Frg section range, and the related data ($k^s$) should be brought into $a_4 e^{b_4 k} + a_5 e^{b_5 k}$ to calculate the converted slip ratio (in this case, all parameters in the formula are known).

Plug the real-time converted slip ratio $SS^s$ obtained by means of the above steps into the overrated factor calculation formula obtained in step 4 to calculate and obtain a real-time overrated factor $OR^s$.

Plug the real-time converted slip ratio $SS^s$ into the dryness fraction calculation formula obtained in step 4 to calculate and obtain the real-time dryness fraction $X^s$.

Step 7, calculate an overrated gas mass flow rate $M_{tp}$ according to Formula (7) as follows:

$$M_{tp} = CEd^2 \sqrt{DP_1^s \ast \rho_g}.\qquad\text{Formula (7)}$$

In the formula, $$E = \frac{\sqrt{2}\cdot\pi}{4\sqrt{1-\beta^4}}.$$

$$\beta = d/D.$$

C represents a Venturi outflow coefficient,
d represents a diameter of the throat of the Venturi, and
D represents a diameter of a straight tube section of a Venturi inlet.

Step 8, calculate a real-time gas phase mass flow rate $M_g$ of wet gas to be measured according to Formula (8) as follows:

$$M_g = M_{tp}/OR^s.\qquad\text{Formula (8)}$$

Step 9, calculate a real-time liquid phase mass flow rate $M_l$ of the wet gas to be measured according to Formula (9) as follows:

$$M_l = \frac{M_g(1 - X^s)}{X^s}.\qquad\text{Formula (9)}$$

Test Case

A test is performed according to the method mentioned in Example 5.

1. Fitting Between Frg and $DP_3$

Fitting is performed on several gas Froude numbers Frg, Venturi pressure loss PL, Venturi differential pressure $DP_1$, and $DP_3 = DP_1 - PL$.

Figure 3:
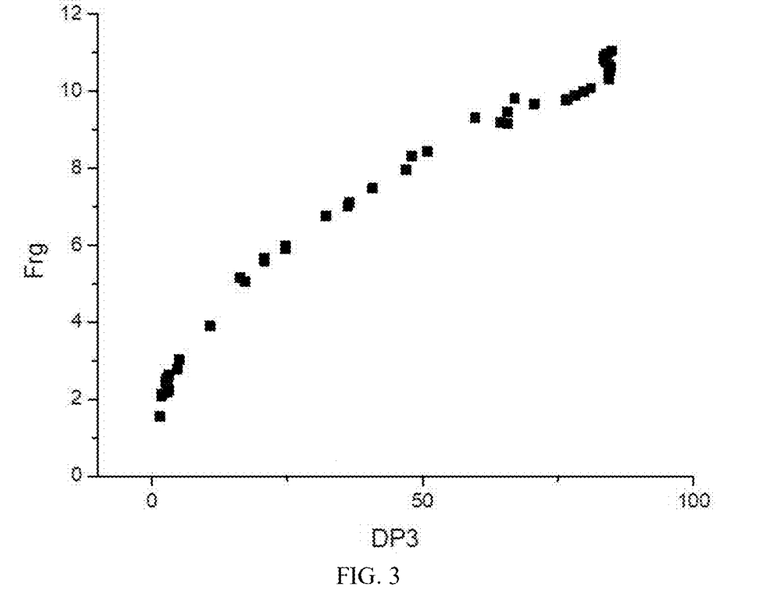
FIG. 3 is a Frg-$DP_3$ curve corresponding to a test case.

Several coordinate points (Frg, $DP_3$) are obtained, which are distributed in a plane rectangular coordinate system as shown in FIG. 3. The relationship between Frg and $DP_3$ by means of fitting is:

$Frg = -5DP_3^3 - 0.002819DP_3^2 + 0.2341DP_3 + 1.728 + 1.534e$,
the degree of fitting thereof is $R^2 = 0.996$, and e is natural number e.

2. Piecewise Fitting

According to experience, it is set that $x_1 = 3.500$ and $x_2 = 9.170$, and the division standard for the high Frg section is $Frg > 9.170$;
the division standard for the medium Frg section is $3.500 \leq Frg \leq 9.170$; and
the division standard for the low Frg section is $Frg < 3.500$.

Figure 4:
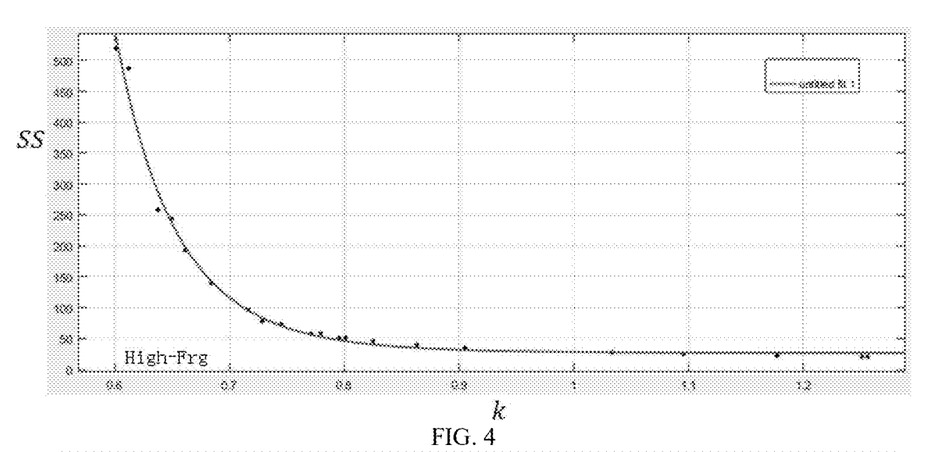
FIG. 4 is a SS-k curve during fitting of a high Frg section corresponding to a test case.
Figure 5:
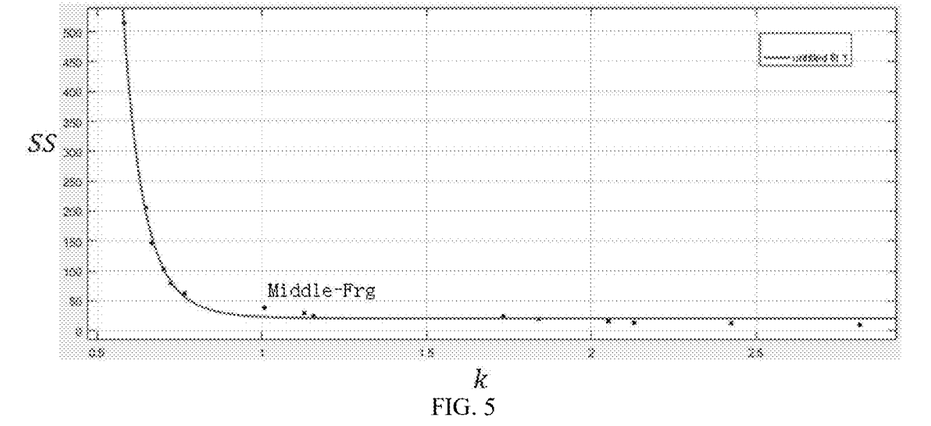
FIG. 5 is a SS-k curve during fitting of a medium Frg section corresponding to a test case.
Figure 6:
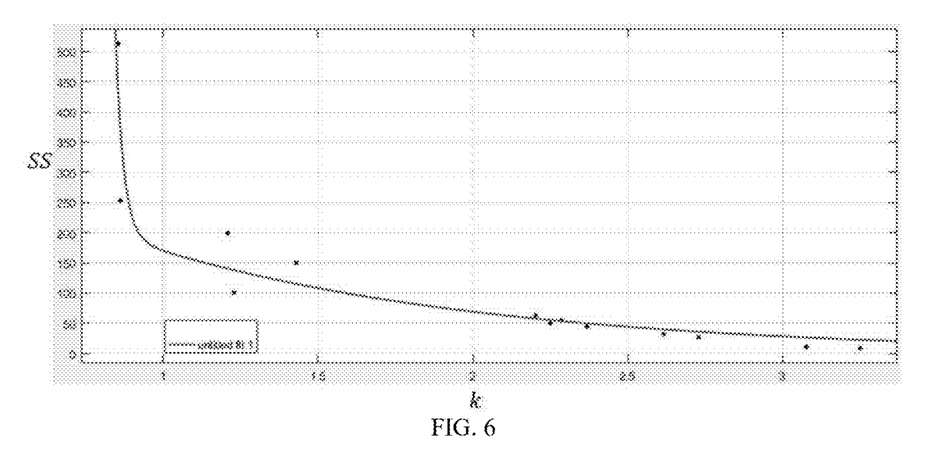
FIG. 6 is a SS-k curve during fitting of a low Frg section corresponding to a test case.

Several coordinate points (SS, k) are obtained by means of calculation, and coordinate points (SS, k) of the high, medium and low Frg sections are distributed in the plane rectangular coordinate system, which are shown in FIG. 4, FIG. 5 and FIG. 6 respectively.

Piecewise fitting is performed on the coordinates (SS, k) of each section to obtain:

$$\begin{cases} SS = 1.509k^{-11.44} + 26.73, & Frg > x_2; \\ SS = 2.928k^{-9.465} + 20.24, & x_1 \le Frg \le x_2; \\ SS = 413.9e^{-0.8947k} + \\ \quad 7.842*10^{16}e^{-39.15k}, & Frg < x_1; \end{cases}$$ Formula group (2)

The degrees of fitting, namely $R^2$, of the above three formulas are 0.990, 0.996 and 0.853 respectively.

3. Fitting of Overrated Factor and Dryness Fraction Calculation Formulas

Figure 7:
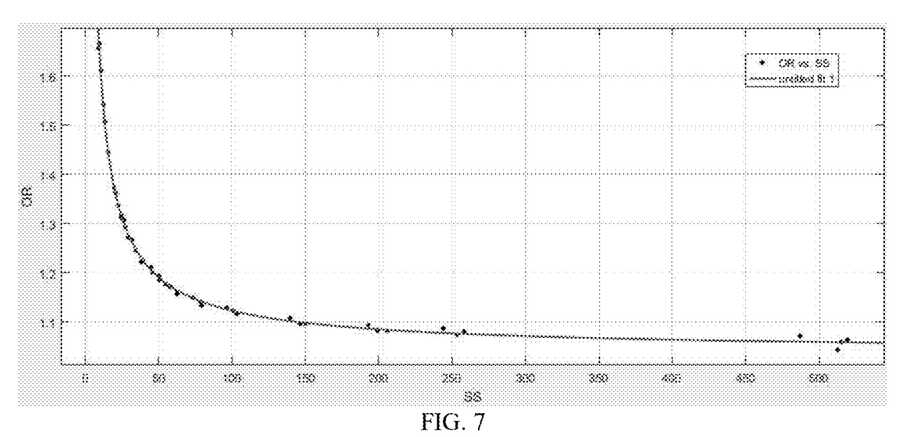
FIG. 7 is a OR-SS curve obtained by means of fitting in a test case.

See FIG. 7 for a scatter diagram of some overrated factors OR and corresponding converted slip ratios SS. Fitting is performed to obtain: $OR=f_4(SS)=a_6 SS^{b_6}+c_6=4.159SS^{-0.8443}+1.038$, and the degree of fitting $R^2=0.997$.

Figure 8:
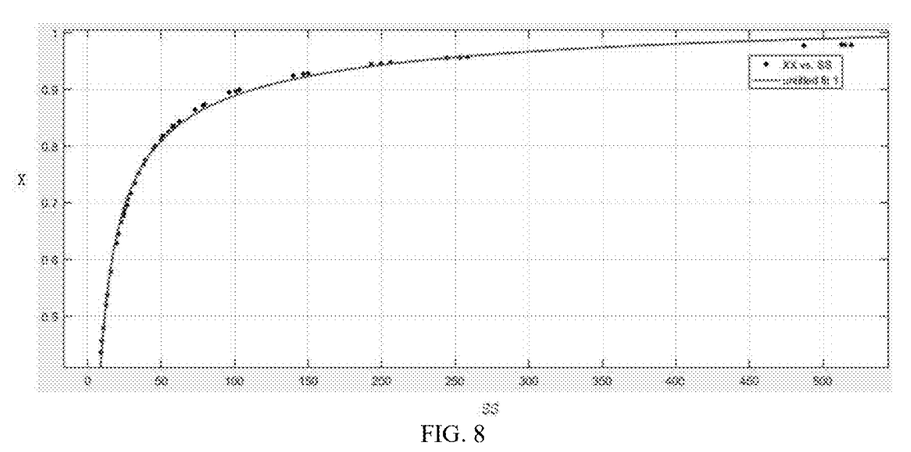
FIG. 8 is a X-SS curve obtained by means of fitting in a test case.

See FIG. 8 for a scatter diagram of some dryness fractions X and corresponding converted slip ratios SS. Fitting is performed to obtain:
$X=f_5(SS)=a_7 SS^{b_7}+c_7=-2.152SS^{-0.5501}+1.059$, and the degree of fitting $R^2=0.997$.

4. Real-Time Data is Acquired, a Real-Time Converted Slip Ratio $SS^s$, a Real-Time Overrated Factor $OR^s$, a real-time dryness fraction $X^s$ and an overrated gas mass flow rate $M_{tp}$ calculated in sequence, and a real-time gas phase mass flow rate $M_g$ and a real-time liquid phase mass flow rate $M_l$ are obtained by means of calculation. Moreover, relative errors $Err_g$ and $Err_l$ are calculated respectively with real-time gas and liquid phase mass flow rates as reference. See Tables 1-1, 1-2 and 1-3 for statistical results.

TABLE 1-1

Statistical table for real-time gas and liquid phase mass flow rates and relative errors (high Frg section)

| | Testing point | $M_g$ | $Err_g$ | $M_l$ | $Err_l$ |
|---|---|---|---|---|---|
| High Frg section | TP40 | 26.145 | −1.00% | 6.483 | 8.47% |
| | TP6 | 26.814 | 0.50% | 0.229 | −61.45% |
| | TP27 | 27.254 | 0.34% | 4.068 | 2.35% |
| | TP35 | 27.689 | −0.36% | 5.901 | 6.66% |
| | TP57 | 29.574 | 4.99% | 12.269 | −20.46% |
| | TP61 | 29.646 | 5.01% | 12.301 | −20.69% |
| | TP11 | 28.383 | 0.82% | 1.077 | −14.12% |
| | TP56 | 29.404 | 3.19% | 12.149 | −15.07% |
| | TP51 | 29.196 | 1.41% | 11.940 | −8.60% |
| | TP50 | 29.100 | 0.17% | 11.696 | −3.35% |
| | TP47 | 29.292 | −1.50% | 10.501 | 6.80% |
| | TP42 | 29.383 | −1.75% | 9.595 | 10.53% |
| | TP41 | 29.671 | −1.64% | 8.492 | 12.93% |
| | TP34 | 29.960 | −1.27% | 7.641 | 13.10% |
| | TP30 | 30.252 | −1.01% | 6.804 | 13.81% |
| | TP26 | 30.712 | −0.19% | 5.345 | 10.82% |
| | TP22 | 31.021 | 0.23% | 4.088 | 11.09% |
| | TP18 | 31.369 | 0.60% | 2.780 | 8.73% |
| | TP17 | 31.611 | 0.76% | 1.953 | 4.83% |
| | TP10 | 31.775 | 0.71% | 1.581 | 6.65% |
| | TP5 | 32.029 | 0.92% | 0.538 | −28.15% |

TABLE 1-2

Statistical table for real-time gas and liquid phase mass flow rates and relative errors (medium Frg section)

| | Testing point | $M_g$ | $Err_g$ | $M_l$ | $Err_l$ |
|---|---|---|---|---|---|
| Medium Frg section | TP71 | 13.598 | 21.97% | 7.401 | −44.37% |
| | TP67 | 16.322 | 12.76% | 8.883 | −33.82% |
| | TP59 | 14.194 | −3.71% | 7.719 | 9.84% |

TABLE 1-2-continued

Statistical table for real-time gas and liquid phase mass flow rates and relative errors (medium Frg section)

| Testing point | $M_g$ | $Err_g$ | $M_l$ | $Err_l$ |
|---|---|---|---|---|
| TP64 | 16.934 | 5.74% | 9.215 | −21.35% |
| TP62 | 16.305 | 0.46% | 8.870 | −7.28% |
| TP66 | 18.666 | 10.33% | 10.157 | −30.39% |
| TP7 | 17.073 | 0.03% | 0.179 | −53.64% |
| TP20 | 19.352 | 0.05% | 1.552 | 1.62% |
| TP32 | 19.736 | −1.55% | 4.146 | 11.70% |
| TP46 | 18.649 | −8.36% | 8.978 | 45.84% |
| TP28 | 21.365 | −0.32% | 3.215 | 3.10% |
| TP52 | 21.472 | −6.03% | 11.180 | 23.88% |
| TP16 | 23.774 | −0.31% | 1.478 | 10.51% |
| TP23 | 24.104 | −0.36% | 2.937 | 8.55% |
| TP58 | 25.596 | −2.99% | 13.448 | 9.52% |

TABLE 1-3

Statistical table for real-time gas and liquid phase mass flow rates and relative errors (low Frg section)

| | Testing point | $M_g$ | $Err_g$ | $M_l$ | $Err_l$ |
|---|---|---|---|---|---|
| Low Frg section | TP72 | 5.460 | 23.81% | 2.676 | −53.03% |
| | TP37 | 5.929 | −0.51% | 1.322 | 4.30% |
| | TP33 | 6.049 | −1.00% | 1.261 | 10.81% |
| | TP9 | 5.983 | −3.93% | 0.383 | 170.24% |
| | TP69 | 7.895 | 23.80% | 3.335 | −51.87% |
| | TP14 | 6.777 | −1.81% | 0.612 | 51.36% |
| | TP21 | 6.856 | −1.47% | 0.756 | 39.57% |
| | TP38 | 7.105 | 1.26% | 1.538 | −5.96% |
| | TP44 | 7.155 | 1.65% | 1.703 | −6.95% |
| | TP48 | 7.573 | 3.53% | 2.196 | −17.12% |
| | TP54 | 7.888 | 5.37% | 2.506 | −23.21% |
| | TP13 | 7.847 | −1.24% | 0.507 | 38.43% |
| | TP25 | 8.771 | 1.82% | 0.808 | −19.03% |

It can be seen from Tables 1-1, 1-2 and 1-3, that the relative error between the gas phase mass flow rate calculated by using the method of Example 5 and a true value is relatively small, and the relative error fluctuation of the liquid phase mass flow rate is relatively large. However, for metering of the wet gas (high gas volume fraction), the stable gas phase mass flow rate with a smaller error has practical guiding significance.

Beneficial effects: fitting is performed with known data by using the method of the present disclosure to obtain the converted slip ratio calculation formula, the overrated factor calculation formula and the dryness fraction calculation formula in sequence. Then, virtual metering is performed in combination with pressure data measured by using a Venturi flow meter, gas density parameters of the wet gas, etc. to calculate flow data of the wet gas, and dependence on a ray flow meter is avoided. The advantages of accurate metering, small errors and no radioactive pollution are achieved.

Finally, it should be noted that the above description are merely preferred examples of the present disclosure. Under the inspiration of the present disclosure, those of ordinary skill in the art can make various similar representations without departing from the spirit and claims of the present disclosure, and such transformations fall within the protection scope of the present disclosure.

What is claimed is:

1. A flow metering method based on converted slip ratio fitting for wet natural gas, being implemented according to the following steps:

step 1, acquiring a fitting array, wherein
the fitting array comprises some one-to-one corresponding data comprising a gas Froude number Frg, Venturi pressure loss PL, Venturi differential pressure $DP_1$, a converted slip ratio SS, a dryness fraction X and an overrated factor OR;

step 2, fitting relationships between the gas Froude number Frg and the Venturi pressure loss PL and Venturi differential pressure $DP_1$ according to Formula (1) as follows:

$$Frg = F(DP_3) \quad \text{Formula (1),}$$

wherein $$DP_3 = DP_1 - PL,$$

and
a gas Froude number calculation formula is obtained by means of fitting;

step 3, setting a division range according to a data size of the gas Froude number Frg, and dividing the fitting array into three sections, namely a high Frg section, a medium Frg section and a low Frg section;
fitting, according to the section to which the fitting array belongs, relationships between the converted slip ratio SS and the Venturi pressure loss PL and the Venturi differential pressure $DP_1$ in sections, as shown in Formula group (2) as follows:

$$\begin{cases} SS = f_1(k), & Frg > x_2; \\ SS = f_2(k), & x_1 \le Frg \le x_2; \\ SS = f_3(k), & Frg < x_1; \end{cases} \quad \text{Formula group (2)}$$

wherein
$x_1, x_2$ are both natural numbers, $x_1 < x_2$, $$k = DP_1/DP_3,$$

and
a piecewise converted slip ratio calculation formula is obtained by means of fitting;

step 4, fitting a relationship between the overrated factor OR and the converted slip ratio SS according to Formula (3) as follows:

$$OR = f_4(SS) \quad \text{Formula (3),}$$

thereby obtaining an overrated factor calculation formula;
fitting a relationship between the dryness fraction X and the converted slip ratio SS according to Formula (4) as follows:

$$X = f_5(SS), \quad \text{Formula (4)}$$

thereby obtaining a dryness fraction calculation formula;

step 5, acquiring a calculation array of wet gas to be measured, wherein
the calculation array comprises some one-to-one corresponding data comprising real-time Venturi pressure loss $PL^s$, real-time Venturi differential pressure $DP_1^s$, and a real-time gas phase density $\rho_g$, wherein the method comprises measuring at least the real-time Venturi pressure loss $PL^s$ and the real-time Venturi differential pressure $DP_1^s$ with a Venturi flow meter, a real-time $k^s$ value is calculated according to Formula (5) as follows:

$$k^s = \frac{DP_1^s}{DP_1^s - PL^s}, \quad \text{Formula (5)}$$

and
a real-time $DP_3^s$ value is calculated according to Formula (6) as follows:

$$DP_3^s = DP_1^s - PL^s; \quad \text{Formula (6)}$$

step 6, calculating a real-time overrated factor $OR^s$ and a real-time dryness fraction $X^s$;
plugging the real-time $DP_3^s$ value into the gas Froude number calculation formula obtained in step 2 to obtain a real-time gas Froude number $Frg^s$, comparing the three values of $Frg^s, x_1$ and $x_2$, and determining the section to which the calculation array belongs by taking the division range set in step 3 as a standard;
plugging the real-time $k^s$ value into the corresponding section in the piecewise converted slip ratio calculation formula obtained in step 3 to calculate and obtain a real-time converted slip ratio $SS^s$;
plugging the real-time converted slip ratio $SS^s$ into the overrated factor calculation formula obtained in step 4 to calculate and obtain a real-time overrated factor $OR^s$;
plugging the real-time converted slip ratio $SS^s$ into the dryness fraction calculation formula obtained in step 4 to calculate and obtain a real-time $X^s$;
step 7, calculating an overrated gas mass flow rate $M_{tp}$ according to Formula (7) as follows:

$$M_{tp} = CEd^2 \sqrt{DP_1^s * \rho_g}, \quad \text{Formula (7)}$$

wherein C and E are both constants, and d represents a diameter of the throat of a Venturi;
step 8, calculating a real-time gas phase mass flow rate $M_g$ of wet gas to be measured according to Formula (8) as follows:

$$M_g = M_{tp}/OR^s; \quad \text{Formula (8)}$$

and
step 9, calculating a real-time liquid phase mass flow rate $M_l$ of the wet gas to be measured according to Formula (9) without requiring application of gamma ray technology as follows:

$$M_l = \frac{M_g(1 - X^s)}{X^s}. \quad \text{Formula (9)}$$

2. The flow metering method based on converted slip ratio fitting for wet natural gas according to claim 1, wherein in step 2, fitting is performed according to Formula (1) as follows:

$$Frg = F(DP_3) = a_1 * DP_3^3 + b_1 * DP_3^2 + c_1 * DP_3 + d_1, \quad \text{Formula (1)}$$

$a_1$, $b_1$, $c_1$, $d_1$ are all natural numbers, and specific parameters are obtained by fitting the gas Froude number Frg, the Venturi pressure loss PL and the Venturi differential pressure $DP_1$.

3. The flow metering method based on converted slip ratio fitting for wet natural gas according to claim 1, wherein in step 3, piecewise fitting is performed according to Formula group (2) as follows:

$$\begin{cases} SS = f_1(k) = a_2 k^{b_2} + c_2, & Frg > x_2; \\ SS = f_2(k) = a_3 k^{b_3} + c_3, & x_1 \le Frg \le x_2; \\ SS = f_3(k) = a_4 e^{b_4 k} + a_5 e^{b_5 k}, & Frg < x_1; \end{cases} \quad \text{Formula group (2)}$$

wherein $a_{2,3,4,5}$, $b_{2,3,4,5}$ and $c_{2,3}$ are all natural numbers, and specific parameters are obtained by fitting the converted slip ratio SS, the Venturi pressure loss PL and the Venturi differential pressure $DP_1$.

4. The flow metering method based on converted slip ratio fitting for wet natural gas according to claim 1, wherein in step 4, fitting is performed to obtain the overrated factor calculation formula according to Formula (3) as follows:

$$OR = f_4(SS) = a_6 SS^{b_6} + c_6, \quad \text{Formula (3)}$$

$a_6$, $b_6$ and $c_6$ are all natural numbers, and specific parameters are obtained by fitting the overrated factor OR and the converted slip ratio SS; and fitting is performed to obtain the dryness fraction calculation formula according to Formula (4) as follows:

$$X = f_5(SS) = a_7 SS^{b_7} + c_7, \quad \text{Formula (4)}$$

wherein $a_7$, $b_7$ and $c_7$ are all natural numbers, and specific parameters are obtained by fitting the dryness fraction X and the converted slip ratio SS.

5. The flow metering method based on converted slip ratio fitting for wet natural gas according to claim 1, wherein in step 3, the division range is artificially set.

\* \* \* \* \*